United States Patent [19]

Larsen

[11] 4,287,058
[45] Sep. 1, 1981

[54] APPARATUS FOR SEPARATING LIQUID-SOLID MIXTURES

[75] Inventor: Gregory J. Larsen, Lakeland, Fla.
[73] Assignee: FMC Corporation, San Jose, Calif.
[21] Appl. No.: 100,174
[22] Filed: Dec. 4, 1979
[51] Int. Cl.³ .............................................. B01D 25/38
[52] U.S. Cl. ................................. 210/112; 100/117; 100/147; 100/148; 210/415
[58] Field of Search ............... 100/117, 147, 148, 150; 210/413–415, 112

[56] References Cited

U.S. PATENT DOCUMENTS

| | | | |
|---|---|---|---|
| 19,421 | 2/1858 | Helton | 100/117 |
| 641,266 | 1/1900 | Bussells | 210/415 |
| 742,971 | 11/1903 | Cummer | 210/415 X |
| 1,772,262 | 8/1930 | Naugle | 210/415 X |
| 1,838,996 | 12/1931 | Lang | 100/148 |
| 2,466,492 | 4/1949 | Sizer | 100/150 X |
| 2,530,951 | 11/1950 | Enright | 210/415 X |
| 2,549,997 | 4/1951 | Zies et al. | 100/147 X |
| 3,003,412 | 10/1961 | Vincent | 100/148 X |
| 3,092,338 | 6/1963 | Reinhall | 100/117 X |
| 3,288,056 | 11/1966 | Ginaven | 100/148 X |
| 3,429,257 | 2/1969 | Belk | 100/213 |
| 3,919,087 | 11/1975 | Brumagim | 210/415 X |

FOREIGN PATENT DOCUMENTS

| | | | |
|---|---|---|---|
| 54-135286 | 10/1979 | Japan . | |
| 951520 | 3/1964 | United Kingdom | 210/415 |
| 648242 | 2/1979 | U.S.S.R. | 210/415 |

*Primary Examiner*—Robert H. Spitzer
*Attorney, Agent, or Firm*—R. S. Kelly

[57] ABSTRACT

An improved screw type apparatus for separating the liquid phase from a solid-liquid mixture includes a conveyor screw and a discharge housing that includes an imperforate cylindrical wall which surrounds the downstream end of the screw tube and has a discharge opening formed therein. A discharge gate is pivotally mounted in the discharge opening, and a pneumatic actuator is provided to bias the gate toward a closed position with a preselected, constant force. Paddles are affixed to the cylindrical downstream end of the screw tube at longitudinal spacings thereon for the purpose of propelling the deliquified solid phase of the mixture about the end of the screw tube, and stripper members are mounted on the interior of the cylindrical discharge housing wall adjacent the discharge opening to extend between the paddles to aid in urging the solid material into the discharge opening.

7 Claims, 3 Drawing Figures

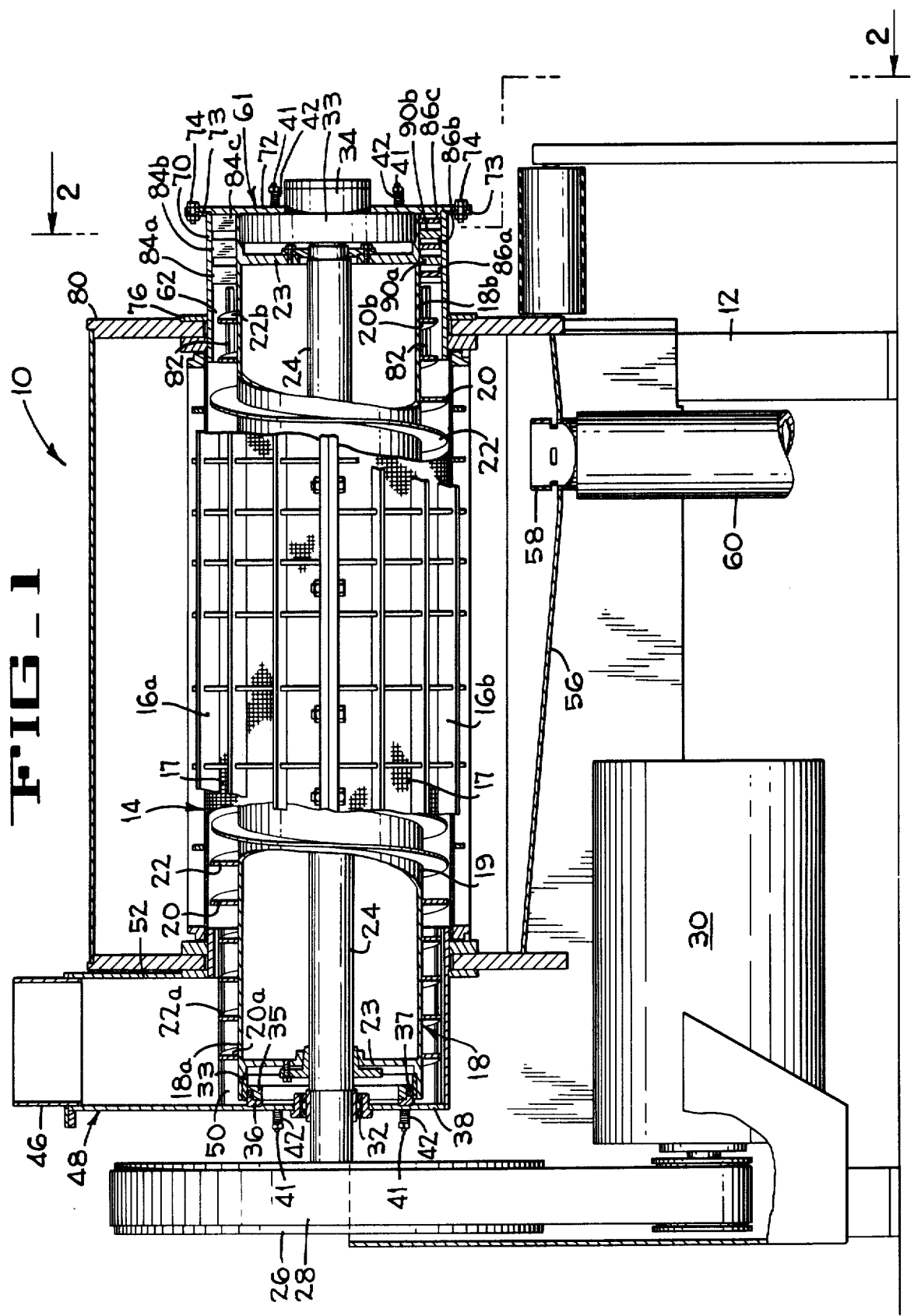

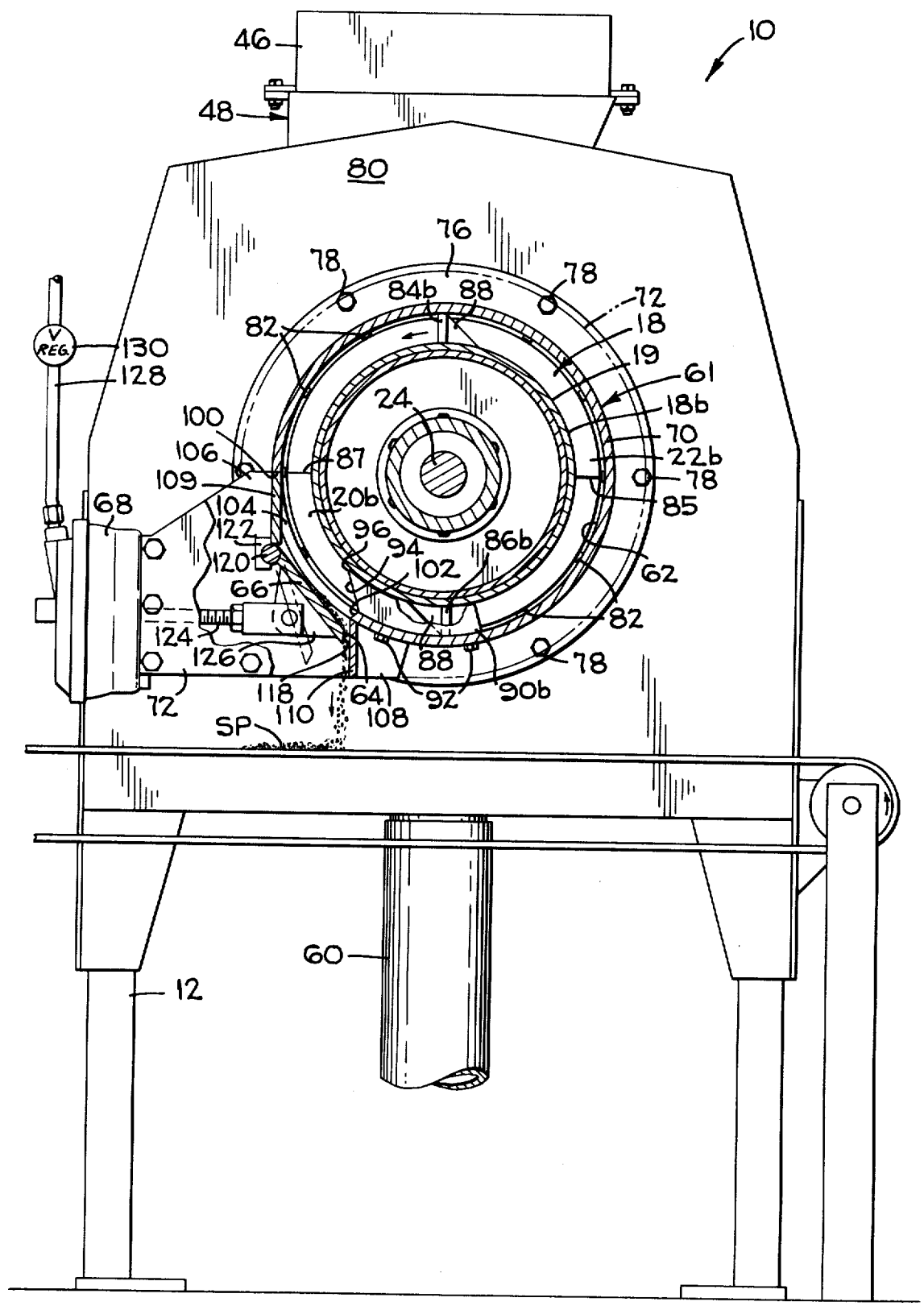
FIG_2

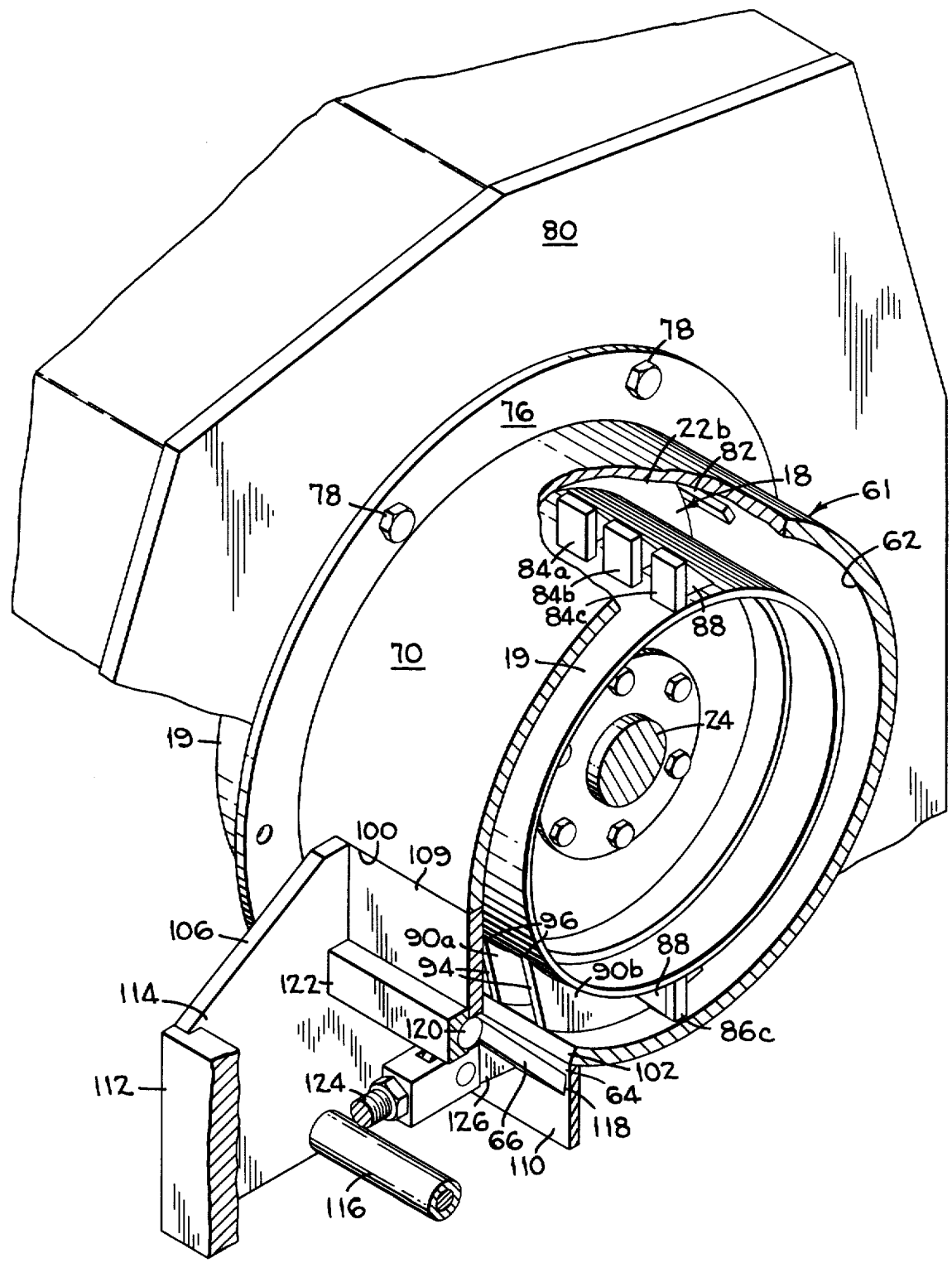
FIG_3

4,287,058

APPARATUS FOR SEPARATING LIQUID-SOLID MIXTURES

BACKGROUND OF THE INVENTION

1. Field of the Invention

The present invention relates to apparatus for separating a liquid phase from a liquid-solid mixture, and more particularly, it pertains to a rotary screw type of liquid-solid separating apparatus.

2. Description of the Prior Art

Screw finishers are extensively used in the citrus fruit processing industry to separate fruit juice from the mixture of the juice, pulp and seeds produced by extraction apparatus; to separate frit (fine pulp particles) from a mixture of water, oil and the frit; and to separate particulate pulp matter from citrus pulp wash mixtures. In one type of screw finisher that is now being used in the citrus processing industry, the discharge opening for the solid, or deliquified, phase of the mixture is formed between the relatively large end of the screw of the finisher and a stripper ring which is biased toward the end of the screw by a pneumatic diaphragm valve that is set to maintain a selected pressure thereby maintaining a relatively constant pressure within the finisher under varying flow rates through the finisher. One major problem with this type of screw finisher is that it is not capable of handling a wide range of consistencies of solid-liquid mixures. For example, when it is desired to separate juice from a mixture containing seeds or coarse peel particles, the annular opening between the stripper ring and the end of the screw must be wide enough to permit the seeds or coarse particles to pass therethrough. Thus, the annular opening must be greater than ⅜ in.; however, this opening size at the large diameter of the annular opening necessitates too great a discharge passage to maintain adequate pressure on the mixture so as to adequately express juice through the screen in the finisher. Accordingly, the finisher cannot be used to separate mixtures of liquids and solids that include solids with very coarse particle sizes.

Another problem with the aforementioned type of prior art finisher is that it will not efficiently separate mixtures that are fed at very low flow rates, even when seeds or other coarse particle sizes are not present. In the aforementioned finisher, the stripper ring must be spaced by about 0.004 in. from the rotating screw to prevent wear of these parts. Since the ring is so large, the total annular opening created by the small clearance is so substantial that the finisher will not maintain adequate pressure on mixtures fed at low flow rates to the finisher.

U.S. Pat. No. 742,971 to Cummer issued Nov. 3, 1903, discloses a screw type of apparatus for separating liquids from a solid-liquid mixture that utilizes a perforate discharge chamber wall having a conical shape at its downstream end adapted to receive a screw conveyor having a complementary conically tapered, helical flight thereon. The chamber terminates in a flat end wall and the discharge opening is formed in the side of the chamber at the bottom thereof. A gate is pivotally mounted to the discharge chamber to cover the opening, and the gate is biased into a closed position by an adjustable counterweight so that the gate will resist flow through the opening and thus enhance the pressure of the mixture within the apparatus.

SUMMARY OF THE INVENTION

The present invention provides an improved apparatus for separating liquid and solid phases from a mixture which apparatus is capable of efficiently separating the liquid phase from a wide variety of liquid-solid mixtures, including relatively seedy or coarse citrus fruit mixtures and which apparatus is also capable of efficiently separating liquids from such mixtures over a wide variety of input flow rates—even at very low flow rates.

The improved apparatus of the present invention includes a screw having a helical conveying flight that extends outwardly from a cylindrical body or tube and a paddle or plurality of paddles disposed downstream of the flight that extend radially outwardly of the screw tube to impel the separated solid phase of the liquid-solid mixture tangentially of the screw tube. A cylindrical discharge housing totally encloses the paddled part of the screw except for an opening formed circumferentially therein through which the solid mixture is adapted to be discharged. A gate may be mounted adjacent the discharge opening, preferably by a simple hinging arrangement, and means are provided to bias the gate toward a position blocking flow through the opening. Thus, as the solid, or deliquified phase, of the mixture is forced by the helical screw flight into the vicinity of the paddles, the paddles urge it about the axis of the screw tube and permit centrifugal forces to urge it radially outwardly. A stripper member may be positioned downstream of the discharge opening to aid in directing the deliquified phase into the opening.

In a preferred embodiment, two or more paddles are longitudinally disposed in a spaced apart relationship on the circumference of the screw tube. The stripper member is comprised of one or more fixed blades mounted within the bore of the discharge housing to project radially into the gaps between the paddles at a location that is immediately downstream of the discharge opening. Each stripper blade preferably has a leading end that slopes rearwardly into the flowing solids directly adjacent to the discharge opening to plow the solids toward the discharge opening.

BRIEF DESCRIPTION OF THE DRAWINGS

FIG. 1 is a side elevation of the improved apparatus of the present invention with portions thereof being broken away and shown in section.

FIG. 2 is an enlarged section taken generally on line 2—2 of FIG. 1, with the pneumatic actuator being shown in full and with the fully opened position of the discharge gate being illustrated in phantom outline.

FIG. 3 is an enlarged fragmentary perspective view of the discharge end of the finisher of FIG. 1 with portions being broken away to illustrate the discharge housing assembly.

DESCRIPTION OF THE PREFERRED EMBODIMENT

Referring now more particularly to FIGS. 1 and 2, it will be seen that an improved apparatus 10 for separating a solid-liquid mixture into liquid and solid phases includes a support frame 12 to which a screen assembly 14 is mounted. The screen assembly includes upper and lower screen frames 16a and 16b, respectively, which are bolted together, and each screen frame includes a semi-cylindrical screen 17. The screen opening size will be understood to be dependent upon the type of mixture to be separated; when the screen is to be used to separate orange pulp from orange juice, the screen opening size may be, for example, 0.02 in. A conveyor screw assembly 18 is rotatably mounted within the screen assembly 14. The liquid-solid mixture is fed to the inlet end 18a (FIG. 1) of the screw assembly and is conveyed to its discharge end 18b (FIG. 1) while the mixture is continuously subjected to pressure to thereby express most of the liquid phase from the mixture through the screen 17.

The screw assembly 18 includes a cylindrical tube 19 and two helical flights 20 and 22 that are welded to the tube in uniformly spaced relation. The cylindrical tube is affixed upon hubs 23 to a drive shaft 24 that extends the entire length of the apparatus. The screw assembly is driven by a pulley 26 that is mounted on the upstream, or intake, end of the drive shaft, and a belt 28 is connected to the pulley and a motor 30 that is mounted to the frame 12 below the screen assembly 14. The drive shaft is supported at the intake and discharge ends of the apparatus within bearing units 32 and 34, respectively. The bearing unit 34 at the discharge end of the shaft is a needle bearing and also a roller type of thrust bearing adapted to prevent axial movement of the shaft. The other bearing 32 at the intake end is a needle bearing. Both ends of the screw assembly are sealed by similar packing gland assemblies mounted within a bushing 33. Each gland assembly comprises an annular packing 37 that is engaged between an adjustable packing gland 35 and a support ring 36 (FIG. 1). The packing gland is adjustably attached to the adjacent end wall 38 or end plate 72 by means of threaded studs 41 that extend from the packing gland through the end wall or end plate and through the support ring 36. Springs 42 are secured about the projective portions of the studs for exerting a selected spring force on the packing gland. The packing glands prevent seepage of the mixture, especially the liquid phase thereof, into the interior of the screw assembly 18 in the vicinity of the bearings 32, 34.

Solid-liquid mixture to be separated is fed through a rectangular feeder tube 46 (FIG. 1) into an intake housing assembly 48 that is secured to the frame 12. The intake housing assembly includes a cylindrical wall portion 50 that is closed at one end by the end wall 38 and that communicates with a tubular inlet portion 52 extending between the feeder tube 46 and the cylindrical wall portion. The upstream ends 20a, 22a of the screw flights 20, 22 have a reduced diameter adapted to extend into the cylindrical wall portion 50 of the intake housing to thereby convey the solid-liquid mixture to the interior of the screen assembly 14 where the screw flights have a relatively larger outer diameter.

The liquid phase (e.g., juice) of the mixture is forced through the screen 17 and is collected within a pan 56 which is mounted to the frame 12 below the screen assembly 14 and which directs the liquid phase into a discharge tube 58 and thence into a conduit 60 for further processing. The solid, or deliquified, phase of the mixture, which has a highly viscous, putty-like consistency, remaining after separation of such liquid phase is then conveyed from the interior of the screen assembly into a discharge housing assembly 61.

It will be appreciated from the foregoing discussion that the amount of the liquid phase expressed through the screen assembly 14 is determined to a large extent by the pressure which the screw assembly exerts on the mixture. An important aspect of the present invention relates to the means within the discharge housing 61 for restricting the flow of the solid phase of the mixture from the ends 20b, 22b of the screw flights 20, 22 to exert a selected, generally constant pressure on the mixture regardless of the flow rate of the mixture into the apparatus and even when there are coarse particles in the solid phase of the mixture.

Generally, the discharge housing assembly 61 includes a cylindrical wall 70 that is concentric with the downstream end of the screw tube 19 to form an annular passageway 62 therebetween. A discharge opening 64 (FIG. 2) having a rectangular outline is formed at one side and near the lower end of the annular passageway. A gate 66 (FIG. 2) is hinged to the discharge housing at the discharge opening to restrict flow through the discharge opening. Such gate is biased toward a position to totally block flow through the discharge opening by a diaphragm type of pneumatic actuator 68 (FIG. 2) which exerts a constant pressure against the gate irrespective of the flow rate of the solid phase of the mixture into the discharge opening.

The annular passageway 62 is defined at its radially outer extremity by the imperforate tubular wall 70 of the discharge housing assembly 61, at its downstream end by a flat end plate 72 (FIG. 1) that is connected by bolts 74 to a flange 73 at the outer end of the tubular wall 70 (the outline of the plate being shown in phantom outline in FIG. 2), and at its inner extremity by the rotating cylindrical tube 19 of the conveyor screw. It will be seen in FIGS. 1 and 3 that a flange 76 is welded to the tubular wall 70 to project radially outwardly therefrom and that such flange is secured by bolts 78 to a vertical wall 80 of the support frame 12. The screen assembly 14 is secured upon the inner end of the tubular portion of the discharge housing, as best seen in FIG. 1. It will also be seen in FIG. 1 that the bearing unit 34 and the adjacent packing gland assembly (only the bushing 33 and adjusting springs 42 being shown) are connected to the end plate 72.

It will be noticed in FIGS. 1 and 2, that downstream ends 20b, 22b of the screw flights 20, 22 within the passageway 62 have a reduced diameter. This reduced diameter is about ½ in. smaller than the interior diameter of the housing wall 70. Ribs 82, formed from straight bars, are longitudinally secured to the interior of the housing wall 70 at equiangularly spaced positions. As can be seen in FIG. 2, the ribs are closely spaced from outer edges of the screw flights 20b, 22b. The ribs and the flights cooperate to carry the deliquified, or solid, phase out of the screen assembly 14 and into the discharge housing 61.

The key aspect of the present invention relates to the means within the discharge housing 61 for directing the putty-like solid phase of the mixture from the annular passageway 62 into the opening 64 in a manner that assures an even flow of all of the solid phase from the apparatus even at very low flow rates through the apparatus. Such means comprises a first set of three paddles 84a, 84b, 84c mounted on one side of the screw tube 19 downstream from the ends of screw flights 20b and 22b and a second set of three paddles 86a, 86b, 86c mounted to the screw tube at the diametrically opposite side thereof from the first set of paddles. Each set of paddles is positioned midway between the terminal edges 85 and 87 of the screw flights 20 and 22, respectively, as seen in FIG. 2. The paddles redirect the solid phase of mixture from its axial flow to a rotary flow about the axis of the screw tube so that it may be directed along a tangential path downwardly into the discharge opening as shown in FIG. 2. The paddles are formed from identical flat strips of metal that are welded to the screw tube 19 to extend radially outwardly from the tube and with the faces thereof being parallel to the axis of the tube. The paddles are braced on their rear faces by triangular members 88 (FIGS. 2 and 3). The paddles are arranged in a uniformly longitudinally spaced relationship with all their rearward faces lying in a common plane which extends through the axis of the screw (FIG. 2). It will be seen in FIG. 1 that the sets of paddles extend the length of the discharge opening, with the paddles at the very end of the screw tube being spaced only a very slight distance from the end plate 72. Thus, with the exception of the gaps between the paddles, the paddles substantially completely fill the area between the cylindrical housing wall 70, the screw tube 19, the end plate 72, and the terminal edges 85 and 87 of the screw flights.

Two stripper plates 90a and 90b (FIG. 3) are mounted to the interior of the tubular wall 70 of the housing assembly directly downstream of the discharge opening 64 and are aligned with the gaps between the paddles 84, 86 to aid in forcing the mixture into the discharge opening 64. The stripper plates have a rectangular profile in end elevation (FIG. 1) with a width to substantially fill the gaps between the paddles and with a height that substantially fills the space between the screw tube 19 and the tubular housing wall 70. They are fastened to the interior of the discharge housing wall 70 by bolts 92 (FIG. 2). The upstream edge 94 of each stripper plate is inclined forwardly into the flow of the mixture (FIG. 2) to form a sharp leading corner 96 which plows the solid mixture from the adjacent portions of the screw tube downwardly toward the discharge opening 64. In other words, the radially inner corner 96 of each stripper plate is formed at an acute angle to act as a plow edge, or knife edge, to strip the solid material from the radially inner portion of the passageway and urge it toward the outside of the annular passageway and into the discharge opening. Generally, the stripper plates 90a, 90b provide resistance to flow of the solid material and create a turbulence at the downstream edge of the discharge outlet which urges such material into the discharge opening.

Having thus described the general arrangement of the discharge housing assembly 61, a detailed description of the construction of the components forming the discharge opening 64 and the elements associated therewith will be provided. The discharge opening 64 is formed at one side by a straight upper edge 100 that extends axially of the tubular wall 70 at the 9:00 o'clock position as seen in the end elevation of FIG. 2. The opposite side of the opening is formed by a lower edge 102 of the tubular wall 70 which is parallel to the upper edge and extends longitudinally of the wall 70 at approximately the 7:00 o'clock position. Another side edge of the opening is formed by the end plate 72 (FIG. 1) and the opposed side edge 104 (FIG. 2) of tubular wall 70 is spaced from the end plate by a distance that is slightly greater than the width of the discharge gate 66. Thus, it will be seen that the discharge opening 64 is contiguous with the end of the tubular housing wall 70 and that it is disposed at the lower side near the bottom of the housing wall.

As shown in FIGS. 2 and 3, a wall 106 is welded to the tubular discharge housing wall 70 to extend outwardly from the innermost side edge 104 of the discharge opening. The wall 106 is normal to the tubular housing wall 70 and has an upper end that is coterminous with the upper edge 100 of the discharge opening and a lower end 108 that extends below the tubular housing wall. Another flat wall 109 extends downwardly from the upper edge 100 of the discharge opening in a plane that is tangent to the tubular housing wall; this wall extends perpendicularly from the wall 106 and is attached thereto. A further wall 110 extends longitudinally of the tubular housing wall 70 adjacent the lower edge 102 of the discharge opening, such wall being secured to the lower end 108 of the wall 106 so as to extend perpendicularly therefrom. Another flat wall 112 (FIG. 3) extends perpendicularly from the outer end 114 of the wall 106. The end plate 72 has an outline in end elevation that is partially defined by the circumferential flange 73 but includes a projecting portion at the lower portion thereof (see FIG. 2) similar to the shape of the wall 106. The end plate is bolted to the flange 73 (as previously pointed out), to the wall 112 (FIG. 2), and also to a post 116 (FIG. 3) that extends perpendicularly from the wall 106. It will be recognized that a discharge passageway is formed between the wall 106, the end plate 72, the wall 110 and the wall 109. As shown in FIG. 2, the solid phase SP of the mixture is permitted to discharge over the downstream, or lower, edge 118 of the gate 66 into such passageway. It will also be noticed in FIG. 2 that the edge 118 is beveled to mate tightly against the adjacent wall 110 when the gate is pivoted fully upwardly into the discharge opening 64. The solid phase will be seen to egress through the rectangular slit between the gate and wall 110, which slit is adjacent the zone of turbulence created by the stripper members 90a and 90b.

The discharge gate 66 has a hinge pin 120 affixed to its upper edge, and the pin is rotatably received in a partially cylindrical cavity formed in a hinge block 122. The hinge block is secured to the lower edge of the vertical wall 109 and extends loosely between the wall 106 and the end plate 72. During operation, the hinge pin is forced by the solid phase of the mixture into a fluid-tight seal with the cavity in the hinge block. The discharge gate 66 is mounted by this arrangement to pivot about the axis of the hinge pin which is parallel to the axis of the tubular discharge housing wall 70 (and thus also parallel to the coaxially mounted screw tube 19) and which is disposed adjacent outer wall 109 of the discharge passageway to provide a streamlined flow of solid material into the discharge passageway.

As previously stated, the discharge gate 66 is biased toward a closed position blocking flow through the discharge opening 64 by an air actuator 68. The actuator includes a diaphragm chamber or cylinder and is normally used for operating brakes in motor vehicles, such type of actuator having a short stroke and a long operating life. A suitable air chamber type of actuator is available from the Westinghouse Air Brake Company of Lexington, Ky. The actuator is fastened to the wall 112 with the piston 124 thereof extending through an aperture in the wall. The piston is pivotally connected to a bracket 126 that extends from the rear face of the discharge gate. Air pressure is supplied to the actuator through a conduit 128 (FIG. 1) by a suitable compressor (not shown), and an adjustable pressure regulating valve 130 is connected to the conduit 128 to enable the actuator to maintain a selected constant pressure on the gate.

The improved apparatus 10 may preferably function as a finisher to separate orange juice from a mixture of pulp tissue, seeds and juice that is fed from several citrus fruit juice extractors. For such use, the pressure regulator 130 is set at a level between 20 and 30 PSI, the exact pressure being dependent upon the consistency and content of the solid phase of the mixture. The operating speed of the drive shaft 24 of the apparatus will be set at 375 R.P.M. or better. It will be appreciated that the flow from the citrus juice extractors will not be constant but will vary according to the volume of citrus fruit fed to the extractors. Advantageously, the improved apparatus 10 will automatically compensate for varying intake flow rates since the pressure on the gate 66 is maintained constant. If the mixture fed to the apparatus should include a large amount of seeds, or especially coarse material, e.g., having a particle size of ⅜ in. or better, such seeds or material may readily flow into the discharge passageway since the length of the slit-like opening between the gate 66 and the wall 110 is relatively short (e.g., 4 in.) so that the width of this opening may be maintained at ⅜ in. or more without lowering the pressure within the apparatus below the desired level necessary for effective screening. In contrast to rotary screw finishers of the type having annular discharge openings with a large radius, such opening between the relatively short edge 118 of the gate 66 and the opposing wall 110 can be relatively wide to let the seeds and coarse material pass through since the total area that is open to discharge flow is small enough to maintain an adequately high pressure upstream from the discharge opening, even at relatively small flow rates through the apparatus. Also, the viscous, putty-like solid phase of the mixture is continuously and smoothly forced by the paddles 84a-84c and 86a-86c and the coacting stripper plates 90a and 90b into the discharge opening 64, thereby assuring continuous flow of the mixture through the apparatus and thus assuring efficient separation within the screen assembly 14.

Although the best mode contemplated for carrying out the present invention has been herein shown and described, it will be apparent that modification and variation may be made without departing from what is regarded to be the subject matter of the invention.

What is claimed is:

1. An improved apparatus for separating a liquid phase and a particulate solid from a mixture thereof, said apparatus including a support frame, a conveyor screw rotatably mounted to said support frame, means for rotating said conveyor screw, screen means surrounding said conveyor screw for filtering the particulate solid material from the mixture fed to the upstream end of said conveyor screw, and means adjacent the downstream end of the conveyor screw for restricting the flow of solid phase from the space between the screw and the downstream end of said screen means to maintain a selected pressure on the mixture between said screw and said screen means, wherein the improvement comprises: said flow restricting means including an extension on the downstream end of said conveyor screw, a housing that encloses said screw extension, said housing including an imperforate cylindrical wall that is coaxial with the axis of rotation of the screw and an end wall that is secured to the downstream end of the cylindrical wall, said screw extension including a cylindrical wall that is concentric with said cylindrical housing wall to thereby form an annular passageway with said cylindrical housing wall that communicates with the space between the screw and said screen means and that terminates at said end wall, at least two paddles secured to said screw extension wall for propelling the solid phase of the mixture forced into said annular passageway in an annular path about said screw extension wall, said paddles being arranged in longitudinally spaced relationship on said screw extension wall, said cylindrical housing wall having a discharge opening formed therein in alignment with said paddles, said opening having a downstream edge relative to the direction of rotation of said paddles, valve means within the said discharge opening for restricting flow through said opening, and at least one stripper member attached to said cylindrical housing wall adjacent said downstream edge of the discharge opening and at a position aligned in the space between the paddles, whereby the stripper member aids in forcing the solid phase propelled by said paddles into said discharge opening.

2. The apparatus according to claim 1 wherein said stripper member has an inclined face that terminates in a sharp radially inner edge that is adjacent to the cylindrical screw extension wall to thereby plow the solid material from adjacent the screw wall and urge such material toward said discharge opening.

3. The apparatus according to claim 1 wherein said valve means includes a gate, means for hinging said gate adjacent said discharge opening, and pressure applying means for pivoting said gate toward a closed position within said discharge opening with a selected biasing pressure.

4. The apparatus according to claim 3 wherein said housing further includes a flat wall affixed to said cylindrical housing wall at the edge of said discharge opening that is opposite said downstream edge, said flat wall extending tangentially of said cylindrical housing wall, said gate being pivotally mounted to said flat wall to pivot about an axis that is parallel to the axis of said cylindrical housing wall to form a slit-like discharge opening adjacent said downstream edge of said cylindrical housing wall.

5. An improved apparatus for separating a liquid phase and a particulate solid from a mixture thereof, said apparatus including a support frame, a conveyor screw rotatably mounted to said support frame, means for rotating said conveyor screw, a screen surrounding said conveyor screw for filtering the particulate solid material from the mixture fed to the upstream end of said conveyor screw, and means adjacent the downstream end of the conveyor screw for restricting the flow of solid phase from the space between the screw and the downstream end of said screen to maintain a selected pressure on the mixture between said screw and said screen, wherein the improvement comprises: said flow restricting means including an extension on the downstream end of said conveyor screw, a housing that encloses said extension of the downstream end of the conveyor screw, said housing including an imperforate cylindrical wall that is coaxial with the axis of rotation of the screw and an end wall that is secured to the downstream end of the cylindrical wall, said extension at the downstream end of said screw including a cylindrical wall that is concentric with said cylindrical housing wall to thereby form an annular passageway with said housing wall that communicates with the space between the screw and said screen means and that terminates at said end wall, a paddle secured to said screw extension wall for propelling the solid phase of the mixture forced into said annular passageway in an annular path about said screw extension wall, said cylindrical housing wall having a discharge opening formed therein in alignment with said paddle, said paddle having a face projecting radially from the screw extension and lying in a plane generally parallel to the axis of the screw extension whereby the paddle acts to project the solid phase of the mixture out of said housing through the discharge opening in a path tangential to the path of movement of the paddle.

6. The apparatus according to claim 5 including a gate, means for hinging said gate adjacent the downstream edge of said discharge opening with respect to the path of travel of the paddle, and pressure applying means for pivoting said gate toward a closed position within said discharge opening with a selected biasing pressure.

7. The apparatus according to claim 6 wherein said housing further includes a flat wall affixed to said cylindrical housing wall at the edge of said discharge opening that is opposite said downstream edge, said flat wall extending tangentially of said cylindrical housing wall, said gate being pivotally mounted to said flat wall to pivot about an axis that is parallel to the axis of said cylindrical housing wall to form a slit-like discharge opening adjacent said downstream edge of said cylindrical housing wall.

* * * * *